(12) United States Patent
Kubota et al.

(10) Patent No.: US 6,485,552 B2
(45) Date of Patent: Nov. 26, 2002

(54) INK COMPOSITION FOR THERMAL INK JET PRINTER OR THERMAL INK PERMEATION PRINTER

(75) Inventors: Yukio Kubota, Saitama-ken (JP); Minoru Suzuki, Tochigi-ken (JP); Kazuyuki Shimbo, Kanagawa-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 09/730,572

(22) Filed: Dec. 7, 2000

(65) Prior Publication Data

US 2001/0029868 A1 Oct. 18, 2001

(30) Foreign Application Priority Data

Feb. 29, 2000 (JP) ........................................ 2000-053748

(51) Int. Cl.[7] ............................................. C09D 11/02
(52) U.S. Cl. ............................... 106/31.27; 106/31.43; 106/31.51; 106/31.6; 106/31.75; 106/31.8
(58) Field of Search ..................... 106/31.27, 31.43, 106/31.51, 31.6, 31.75, 31.8

(56) References Cited

U.S. PATENT DOCUMENTS

| | | | |
|---|---|---|---|
| 3,445,234 A | 5/1969 | Cescon et al. | 430/332 |
| 4,369,065 A | * 1/1983 | Brixius | 106/31.35 |
| 4,562,116 A | 12/1985 | Okada et al. | 428/402.21 |
| 4,644,376 A | 2/1987 | Usami et al. | 346/215 |
| 4,749,796 A | 6/1988 | Sensui et al. | 549/225 |
| 4,975,117 A | 12/1990 | Tabayashi et al. | 106/31.58 |
| 6,105,502 A | * 8/2000 | Wagner et al. | 101/483 |
| 6,139,914 A | 10/2000 | Suzuki et al. | 427/213.3 |

FOREIGN PATENT DOCUMENTS

| | | | | |
|---|---|---|---|---|
| JP | 55102290 A | * 8/1980 | | H05K/1/11 |
| JP | 58-33492 | 2/1983 | | |
| JP | 58063424 A | * 4/1983 | | B29C/23/00 |
| JP | 58-82785 | 5/1983 | | |
| JP | 62198494 | 9/1987 | | |
| JP | 02-14353 | 4/1990 | | |
| JP | 7-78187 | 8/1995 | | |
| JP | 7-78188 | 8/1995 | | |
| JP | 8-6057 | 1/1996 | | |
| JP | 8-26259 | 3/1996 | | |

OTHER PUBLICATIONS

Derwent abstract of JP60006438, Jan. 1985.*
Derwent abstract of JP55102290, Aug. 1980.*
Derwent abstract of JP58063424, Apr. 1983.*

* cited by examiner

Primary Examiner—Helene Klemanski
(74) Attorney, Agent, or Firm—Greenblum & Bernstein, P.L.C.

(57) ABSTRACT

An ink composition includes an oil-based ink and a heat decomposition gas-developing agent that generates gas by a relatively small amount of heat. A thermal printer using the ink composition is not clogged with the composition even after a long-term storage, and provides a printed matter having excellent water resistance. Thus, the ink composition is remarkably useful for a thermal ink jet printer and a thermal ink permeation printer.

7 Claims, 1 Drawing Sheet

INK COMPOSITION FOR THERMAL INK JET PRINTER OR THERMAL INK PERMEATION PRINTER

BACKGROUND OF THE INVENTION

The present invention relates to an ink composition useful for a thermal ink jet printer or a thermal ink permeation printer, particularly to such that generates gas by relatively small amount of heat, and that causes no clog of nozzles of a thermal printer even after a long-term storage.

Thermal ink jet printers and thermal ink permeation printers have been well known as thermal printers that eject ink to a recording medium by heating. In the thermal printers, the ink is heated by heating elements to generate gas, thereby increasing an inner pressure of an ink fountain. According to the thermal ink jet printers, the ink is jetted by the increased inner pressure through nozzles onto a recording sheet, to provide an image on the sheet. According to the thermal ink permeation printers, the ink permeates through a porous film disposed between a thermal head and a recording sheet by the increased inner pressure, to provide an image.

Thus, the thermal printers eject the ink to a recording medium by gas-development from the ink, whereby the ink is required to generate gas by small amount of heat. Conventionally, aqueous inks having a low boiling point obtained by dissolving a water-soluble dye in water or in a mixed solvent of water and a hydrophilic solvent have been mostly used as the ink for the thermal printers.

The aqueous inks have advantage of generating gas by relatively small amount of heat. However, in the thermal printer using the aqueous inks, water composing the inks is often vaporized to provide a dried dye. The dried dye causes clog of nozzles of the printer, whereby the printer must be periodically cleaned. In such a case, because it is difficult to arrange a plurality of nozzles in one direction to form a line head, the thermal printer generally exhibits a low printing speed. Further, a printed matter obtained by such aqueous inks is poor in water resistance, so that deterioration such as stain of a printed image is caused by water.

OBJECT AND SUMMARY OF THE INVENTION

Accordingly, an object of the present invention is to provide such an ink composition for a thermal ink jet printer or a thermal ink permeation printer that generates gas by relatively small amount of heat, that causes no clog of nozzles of a thermal printer even after a long-term storage, and that provide a printed matter excellent in water resistance.

As a result of intense research in view of the above object, the inventors have found that an ink composition as mentioned above is obtained by adding a heat decomposition gas-developing agent (blowing agent) to an oil-based ink. The present invention has been accomplished by this finding.

Thus, an ink composition of the present invention comprises: an oil-based ink composed of an organic solvent, and an oil-soluble dye and/or a pigment dissolved or dispersed in the organic solvent; and a heat decomposition gas-developing agent that is decomposed by heating to a decomposition temperature thereof to generate gas. Although conventional ink compositions using a nonvolatile solvent generally have a high boiling point, the ink composition of the present invention exhibits an apparent boiling point reduced by the heat decomposition gas developing agent. The heat decomposition gas-developing agent is decomposed to generate $N_2$ gas, etc. by heating, whereby the ink composition of the present invention is ejected by a relatively small amount of heat, to be useful for the thermal ink jet printer or the thermal ink permeation printer. Further, when a preferred nonvolatile solvent is used as the organic solvent composing the oil-based ink, the nozzles of the thermal printer are not clogged with the ink composition even after a long-term storage, whereby above-mentioned periodical cleaning is simplified or omitted.

DETAILED DESCRIPTION OF THE PREFERRED EMBODIMENTS

[I] Ink Composition

Figure 1:
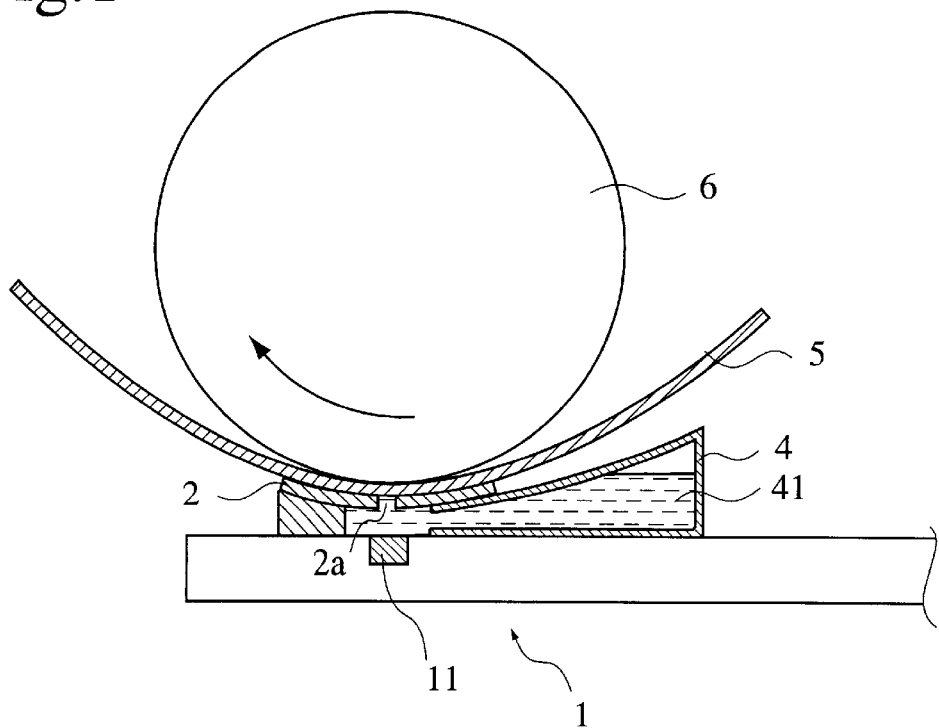
FIG. 1 is a partial cross-sectional view showing an example of a thermal ink permeation printer using an ink composition according to the present invention.

An ink composition of the present invention comprises: an oil-based ink composed of an organic solvent, and an oil-soluble dye and/or a pigment dissolved or dispersed in the organic solvent; and a heat decomposition gas-developing agent (blowing agent). The heat decomposition gas-developing agent is decomposed by heating to a decomposition temperature thereof to generate gas such as $N_2$ gas, etc. Therefore, even if the ink composition has a high boiling point, the ink composition can be ejected by a relatively small amount of heat. The gas-developing agent and the oil-based ink used in the present invention will be described in detail below.

[A] Heat Decomposition Gas-developing Agent

The ink composition of the present invention is characterized in comprising a heat decomposition gas-developing agent. The heat decomposition gas-developing agent is preferably decomposed at 70 to 300° C. to provide a gas. Its decomposition temperature is more preferably 80 to 210° C., particularly preferably 100 to 160° C.

Typical examples of the gas-developing agent preferably used in the present invention include: (1) azo gas-developing agents such as azodicarbonamide (ADCA), azobisisobutyronitrile (AIBN), 4,4'-azobiscyano valeric acid, t-butyl azoformamide, 2,4-bis(azosulfonyl) toluene, 2,2'-azobisisobutyro amide, methyl-2,2'-azobisisobutylate, 2-(carbamoylazo)isobutyronitrile and 1,1'-azobiscyclohexane carbonitrile; (2) nitroso gas-developing agents such as N,N'-dinitrosopentamethylene tetramine (DPT) and N,N'-dinitroso-N,N'-dimethyl terephthalamide; (3) sulfonyl hydrazide gas-developing agents such as p-benzenesulfonyl hydrazide, p-toluenesulfonyl hydrazide (TSH) and p,p'-oxybis(benzenesulfonyl hydrazide) (OBSH); etc.

Among them, particularly preferred are azodicarbonamide (ADCA), azobisisobutyronitrile (AIBN), N,N'-dinitrosopentamethylene tetramine (DPT), p-toluenesulfonyl hydrazide (TSH) and p,p'-oxybis(benzenesulfonyl hydrazide) (OBSH). The decomposition temperatures thereof are shown in Table 1.

TABLE 1

Decomposition temperature of heat decomposition gas-developing agent

| Heat decomposition gas developing agent | Decomposition temperature |
|---|---|
| ADCA | 200 to 210° C. |
| AIBN | 100 to 102° C. |
| DPT | 200 to 205° C. |
| TSH | 103 to 107° C. |
| OBSH | 155 to 160° C. |

According to the present invention, the heat decomposition gas-developing agent may be appropriately selected depending on desired gas-developing temperature. The gas-developing agent may be used singly or together with another gas-developing agent. Additives such as gas-developing auxiliaries may be added to the agent, to lower the gas-developing temperature, to control gas amount, etc.

Content of the gas-developing agent, which depends on the type thereof, is generally 0.1 to 40 parts, preferably 5 to 30 parts, more preferably 10 to 20 parts by weight based on the entire ink composition of 100 parts. When the content is less than 0.1 parts, the gas is insufficiently generated. On the other hand, when the content is more than 40 weight %, viscosity of the ink composition is excessively increased.

In the case of using a fine powdery heat decomposition gas-developing agent insoluble in the organic solvent, an average diameter of the powders is preferably 3 $\mu$m or less, more preferably 1 $\mu$m or less, to prevent the ink composition from clogging the thermal printer.

[B] Oil-Based Ink

The oil-based ink used in the present invention is not particularly limited, may be known oil-based inks for an electric field control-type thermal ink jet printer, etc. described in Japanese Patent Publication Nos. 7-78187, 7-78188, 8-6057, 8-26259, etc.

Such known oil-based inks hardly cause clog of the nozzles of the thermal printer, whereby a plurality of nozzles can be arranged in one direction to form a line head. These oil-based inks comprise an oil-soluble dye dissolved or dispersed in a solvent with high concentration, thereby providing an image which is deep and clear equally to a silver halide photography. Further, the oil-soluble dyes used for these oil-based inks are superior in water-resistance to water-soluble dyes used for the aqueous inks, and can be designed considering light-resistance, ozone-resistance, etc. more freely as compared with the water-soluble dyes. Furthermore, the oil-based inks hardly cockle or wrinkle a printed surface of a recording sheet. As described above, the oil-based inks have many advantages to be used in a field of printing with high resolution and excellent image quality.

An oil-based ink used in the present invention is composed of an organic solvent, and an oil-soluble dye and/or a pigment dissolved or dispersed in the organic solvent.

Examples of the oil-soluble dye include naphthol dyes, azo dyes, metal complex dyes, anthraquinone dyes, quinoimine dyes, indigoid dyes, cyanine dyes, quinoline dyes, nitro dyes, nitroso dyes, benzoquinone dyes, carbonium dyes, naphthoquinone dyes, naphthalimide dyes, phthalocyanine dyes, perylene dyes, etc. Examples of the pigment include azo pigments having poor solubility, insoluble azo pigments, condensed azo pigments, phthalocyanine pigments, quinacridone pigments, dioxazine pigments, isoindolinone pigments, inorganic pigments such as titanium oxide, zinc oxide, lead chromate pigments and cadmium pigments, etc.

The organic solvent used for the oil-based ink may be selected depending on the characteristics of an ink-ejecting head of the ink jet printer. Also, the organic solvent may be selected from a viewpoint of safeness.

Typical examples of the organic solvent include: petroleum naphtha solvents; aromatic petroleum solvents; aliphatic petroleum solvents; naphthene petroleum solvents; aromatic hydrocarbon solvents such as mono- or di-substituted alkylnaphthalene, alkylated derivatives of biphenyl, xylylethane and phenethylcumene; alkyl alcohols having 1 to 4 carbon atom such as methanol, ethanol, n-propanol, isopropanol, n-butanol, sec-butanol, tert-butanol and isobutanol; amides such as dimethylformamide and dimethylacetamide; ketones and diketone alcohols such as acetone and diacetone alcohol; ethers such as tetrahydrofuran and dioxane; polyalkylene glycols such as polyethylene glycol and polypropylene glycol; alkylene glycols containing an alkylene group having 2 to 6 carbon atoms such as ethylene glycol, propylene glycol, butylene glycol, triethylene glycol, 1,2,6-hexanetriol, thiodiglycol, hexylene glycol and diethylene glycol; polyvalent alcohol lower alkyl ethers such as glycerin, ethyleneglycol methyl ether, diethyleneglycol methyl ether, diethyleneglycol ethyl ether and triethyleneglycol monomethyl ether; phosphates such as tributyl phosphate, tri-2-ethylhexyl phosphate and triphenyl phosphate; phthalates such as dimethyl phthalate, diethyl phthalate, dibutyl phthalate, diheptyl phthalate, di-n-octyl phthalate, di-2-ethylhexyl phthalate, diisononyl phthalate, octyldecyl phthalate and butylbenzyl phthalate; aliphatic monobasic acid esters such as butyl oleate and glycerin mono-oleate; aliphatic dibasic acid esters such as dibutyl adipate, di-2-ethylhexyl adipate, di-2-ethylhexyl azelate, dibutyl sebaciate and di-2-ethylhexyl sebaciate; oxyacid esters such as methyl acetylricinolate, butyl acetylricinolate, butylphthalylbutyl glycolate and tributyl acetylcitrate; plasticizers such as chlorinated paraffin, chlorinated biphenyl, 2-nitrobiphenyl, dinonylnaphthalene, N-ethyl-o-toluenesulfonamide, N-ethyl-p-toluenesulfonamide, camphor and methyl abietate; etc. These organic solvents may be used singly or together with each other.

To the oil-based ink may be added additives such as a sequestering agent, a surface tension-controlling agent, a surface active agent, a viscosity modifier, an ultraviolet-absorbing agent, an antiseptic agent, a water-resisting agent, a rheology modifier, an antioxidant, etc. to improve stability and durability of the ink composition before or after ejecting.

A coloring matter, namely, the oil-soluble dye or the pigment, can be easily dissolved or dispersed in the above solvent with higher concentration as compared with the conventional aqueous inks. In the case of using the oil-based ink, ink-ejecting head of the thermal printer is not clogged even if the coloring matter is dissolved or dispersed therein with a concentration which is several times to ten and several times as high as that obtained in the case of using the aqueous ink. Thus, the oil-based ink can be economically ejected to obtain an image.

[II] Method for Using Ink Composition

An ink composition of the present invention comprises an oil-based ink and a heat decomposition gas-developing agent that generates gas by a relatively small amount of heat. A thermal printer using the ink composition is not clogged with the composition even after a long-term storage, and provides a printed matter excellent in water resistance. Thus, the ink composition is remarkably useful for a thermal ink jet printer and a thermal ink permeation printer.

The thermal ink jet printer, which the ink composition of the present invention may be used for, is not particularly limited. The ink composition may be used for various commercially available thermal ink jet printers.

In the thermal ink permeation printers, a porous film disposed between a thermal head and a recording sheet controls an amount of ink ejection. The thermal ink permeation printers generally have an ink fountain placed around the thermal head, and the ink composition permeates through the porous film when it is heated by the thermal head. The thermal ink jet printer has to comprise a gap between the nozzles and the recording sheet, so that there is a case where printing resolution is lowered by ink-scattering. As compared with this, the thermal ink permeation printer has the porous film contacting with the recording sheet, thereby printing with high resolution. Further, because the thermal ink permeation printer uses the porous film instead of the nozzles, it has a simple structure, thereby reducing production costs. In addition, the thermal ink permeation printer is made to have a line head structure with ease, thereby exhibiting high printing speed.

Shown in FIG. 1 is an example of a thermal ink permeation printer using an ink composition according to the present invention. The ink permeation printer shown in FIG. 1 comprises a thermal head 1 having a heating element 11, a film 2 facing the heating element 11, an ink fountain 4 disposed between the thermal head 1 and the film 2 for maintaining an ink composition 41, a roller platen 6 for conveying a recording paper 5, and an ink amount-controlling unit which is placed nearby the heating element 11. When the ink composition 41 is heated by the heating element 11, the heat decomposition gas-developing agent contained therein is decomposed and generates gas to increase an inner pressure of the ink fountain 4, and the film 2 having a pore $2a$ that is closed under ordinary circumstances is softened. The increased inner pressure and the softening of the film 2 make possible permeation of the ink composition 41 through the pore $2a$ of the film 2. In this manner, the ink composition is ejected through the film 2 to the recording paper 5.

The present invention is described in more detail below by reference to Examples without intention of restricting the scope of the present invention.

EXAMPLE 1

200 g of p,p'-oxybis(benzenesulfonyl hydrazide (OBSH) ("Celmike S" manufactured by Sankyo Chemical Co., Ltd.) and 80 g of a dye ("Red #809" manufactured by Yamamoto Chemicals Inc.) was mixed with 1500 g of diisopropyl naphthaline ("KMC-113" manufactured by Rutgers Kreha Solvents Gmbh). Then, OBSH was uniformly dispersed in the resultant mixture while grinding OBSH into particles having an average diameter of 1 $\mu$m or less by a ball mill, to obtain an ink composition for thermal ink jet printers.

COMPARATIVE EXAMPLE 1

An ink composition for thermal ink jet printers was obtained in the same manner as EXAMPLE 1 except that OBSH is not mixed.

COMPARATIVE EXAMPLE 2

An aqueous ink composition for thermal ink jet printers was obtained by mixing 10 g of a dye ("Brilliant blue FCF" manufactured by Tokyo Kasei Kogyo Co., Ltd.) with 100 g of water.

Figure 2:
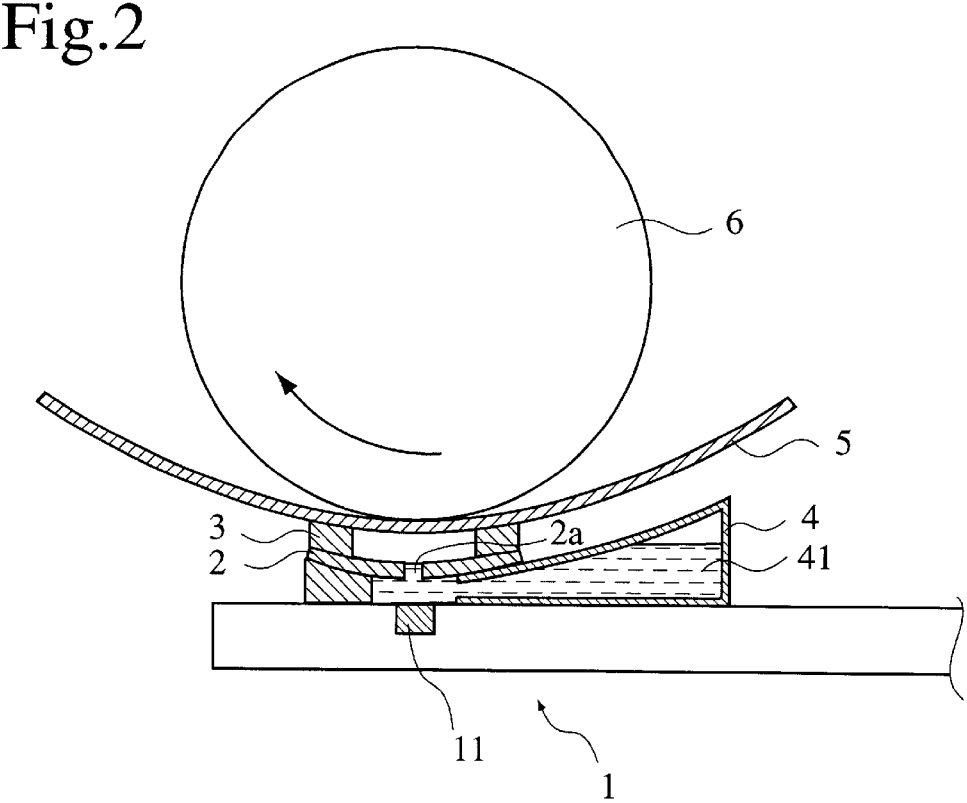
FIG. 2 is a partial cross-sectional view showing an example of a thermal ink jet printer used in Example.

The ink compositions according to Example 1 and Comparative examples 1 and 2 were subjected to an evaluation. A thermal ink jet printer shown in FIG. 2, which uses a polyimide film 2 having pores $2a$ instead of nozzles, was used for the evaluation. According to each ink composition, minimum voltage needed to print was measured while gradually increasing voltage applied to the thermal ink jet printer. The printer comprised a thermal head line having a resistance of 2800 $\Omega$ and a resolution of 300 dpi, and each voltage was applied for 2.0 msec. The polyimide film 2 had a thickness of 0.05 mm, and a spacer 3 of Teflon (trademark) shown in FIG. 2 had a thickness of 0.5 mm. The pore $2a$ had a diameter of $\phi$ 25 $\mu$m, and was placed just above the heating element 11. Distance between the heating element 11 and the polyimide film 2 was 0.2 mm or less in length.

After printing, the head of the thermal ink jet printer filled with each ink composition was placed in a thermostatic chamber (80° C., 0 to 10% RH) for 2 hours, thereby evaluating whether the head was clogged with the ink composition after storage. Table 2 shows the minimum voltage needed to print, and whether the clog of the thermal ink jet printer was found or not, accordingly to each ink composition.

TABLE 2

|  | Solvent | Gas-developing agent | Minimum voltage | Clog |
| --- | --- | --- | --- | --- |
| Ex. 1 | KMC-113 | OBSH | 18 V | Not found |
| Comp. Ex. 1 | KMC-113 | — | 24 V | Not found |
| Comp. Ex. 2 | Water | — | 14 V | Found |

As shown in Table 2, comparing with that the ink composition according to Comparative example 1 needed voltage of 24 V to be ejected, the ink composition comprising the gas-developing agent according to Example 1 was ejected by lower voltage, 18 V. The printer using the ink composition according to Example 1 was not clogged with the composition even after placing in the thermostatic chamber for 2 hours to maintain its function. Although the ink composition comprising the aqueous ink according to Comparative example 2 showed a low minimum voltage, 14 V, the printer using the ink composition was clogged with the composition.

As described in detail above, an ink composition of the present invention comprises an oil-based ink and a heat decomposition gas-developing agent that generates gas by a relatively small amount of heat. The printer using the ink composition is not clogged with the composition even after a long-term storage, and provides a printed matter excellent in water resistance. Thus, the ink composition of the present invention is remarkably useful for a thermal ink jet printer and a thermal ink permeation printer. The present disclosure relates to subject matter contained in Japanese Patent Application No. 2000-53748 (filed on Feb. 29, 2000) which is expressly incorporated herein by reference in its entirety.

What is claimed is:

1. An oil-based ink composition for a thermal ink jet printer or a thermal ink permeation printer comprising:
    an organic solvent;
    an oil-soluble dye and/or pigment dissolved or dispersed in the organic solvent; and
    a heat decomposition gas-developing agent that can be decomposed by heating to a decomposition temperature thereof to generate a gas and thereby eject or permeate the ink composition to a recording medium.

2. The ink composition of claim 1, wherein the heat decomposition gas-developing agent comprises 0.1 to 40 parts by weight based on the entire ink composition of 100 parts.

3. A printing method comprising operating a thermal ink jet printer or a thermal ink permeation printer using an ink composition according to claim 1, the operating including ejecting or permeating the ink composition to the recording medium.

4. The ink composition of claim 1, wherein the decomposition temperature of the heat decomposition gas-developing agent is 100 to 160° C.

5. The ink composition of claim 1, wherein the decomposition temperature of the heat decomposition gas-developing agent is 70 to 300° C.

6. The ink composition of claim 5, wherein the heat decomposition gas-developing agent comprises an organic compound selected from azodicarbonamide, azobisisobutyronitrile, N,N'-dinitrosopentamethylene tetramine, p-toluenesulfonylhydrazide, or p,p-oxybis(benzenesulfonyl hydrazide).

7. An oil-based ink composition for a thermal ink jet printer or a thermal ink permeation printer comprising:

an organic solvent;

an oil-soluble dye and/or pigment dissolved or dispersed in the organic solvent;

a heat decomposition gas-developing agent that can be decomposed by heating to a decomposition temperature thereof to generate a gas and thereby eject or permeate the ink composition to a recording medium;

wherein the thermal ink jet printer or a thermal ink permeation printer comprises a thermal head comprising a heating element, a film having a pore facing the heating element, an ink fountain disposed between the thermal head and the film, a roller platen of conveying a recording paper, and an ink amount-controlling unit placed nearby the heating element.

* * * * *